3,443,374
ENCAPSULATED WIRE CABLE AND METHOD OF ENCAPSULATION THEREOF
Umberto A. Carnevale, Wilmington, Del., assignor to All American Engineering Company, Wilmington, Del., a corporation of Delaware
Filed Sept. 30, 1966, Ser. No. 587,636
Int. Cl. H01b 3/42
U.S. Cl. 57—149                                             8 Claims

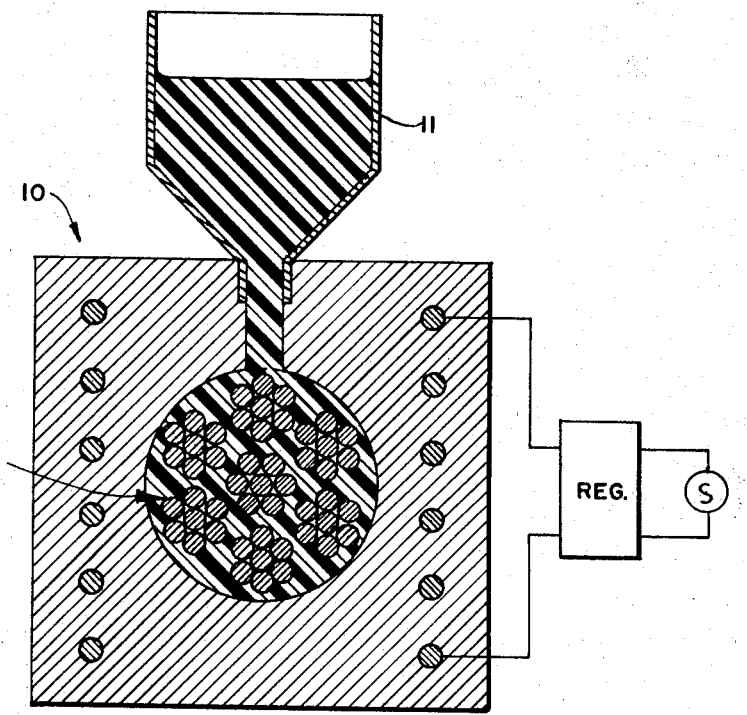
FIG. I.
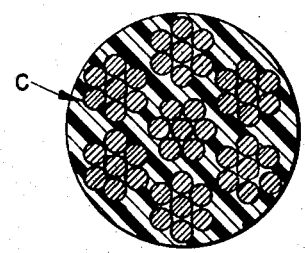
FIG. 2.
*INVENTOR*
Umberto Anthony Carnevale
BY *Birch and Birch*
ATTORNEYS United States Patent Office 3,443,374
Patented May 13, 1969

ABSTRACT OF THE DISCLOSURE

Wire cable comprising a plurality of strands with each strand encapsulated in a solid capsule formed of cured polyurethane elastomer. The strands of the cable being first coated with a primer compound and heated, then the elastomer is poured into a mold around the primed strands and cured.

---

The present invention relates to encapsulation of wire rope or cable and more particularly to encapsulation of multi-strand wire cable with liquid urethane polymers cured to form a strong, rubbery solid by reaction with the terminal isocyanate groups in the polymer with a suitable curing agent to form high molecular weight poly-urea urethanes.

Heretofore wire rope has been encapsulated with polyamides and polyethylene plastic materials, but such plastic materials have been found unsatisfactory because they lack durability when used under heavy loads and with frequent bending stresses, which cause constant abrasive action, such as encountered for use as launching cables or for arresting gear deck pendants and the like.

Accordingly, it is an object of this invention to provide a satisfactory coating not having the above objections by polyurethane impregnation of wire cables, whereby superior abrasive resistant properties and high energy absorbing properties for vibration dampening during use under heavy loads and frequent bending stresses at any temperatures likely to be encountered during use are attained. For example, vibrations on the usual wire rope or cable will cause cycle stresses, which during use eventually result in fatigue fracture, particularly when subjected to heavy work, such as encountered when used for aircraft launching or arresting cables.

Another object is to provide a system of encapsulating wire cable, such as twister multi-strand cable in a solid cured polyurethane compound to obtain mechanical retention and abrasive resistance of each cable strand to increase life of the cable.

Still another object is to provide a method of molding and curing a liquid polyurethane elastomer to a solid state, while bonding the castable polyurethane mix to the metal surfaces of the respective strand sections of metal cable for complete encapsulation of each of said strand sections thereof.

A further object is to provide novel composite durable launching and arrest cables for aircraft used in connection with various types of aircraft arrest gear.

It is further emphasized that this invention when fabricated with an encapsulation of cured polyurethane elastomer is very efficient in use and reduces the self-destructive characteristics of the usual twisted strand wire rope or cable, which during normal operating conditions develops high internal pressure. The proximate cause of internal pressure in the usual wire rope is because its elongated strand sections are helically formed and each helix section tends to elongate and decrease in diameter under linear working loads and will also deform due to repeated bending stresses caused when reeved around deck sheaves and the like as required during working conditions. These working loads and bending stresses and resultant internal pressures produce longitudinal movements of the helical wire rope sections and abrasive motion of its respective strands, thereby causing wear and ultimate strand fracture. Accordingly, as set forth above, this invention is to provide protective encapsulation of rope sections, to restrain the longitudinal movements of the rope or cable strands to increase the fatigue life thereof.

One form of apparatus used to practice the present invention is shown in FIGURE 1; and FIGURE 2 is a transverse section taken through a wire cable encapsulated with the compound.

Many arrangements for compounding the liquid urethane elastomer with a suitable curing agent and the encapsulation of the wire cable may be used, for example, in the accompanying drawings one form of device may be a suitably heated mold, as shown in FIGURE 1. Also, as shown in FIGURE 2 wire rope after encapsulation is shown in transverse section, whereby complete mechanical retention is attained by the solid casting of cured polyurethane.

In the practice of the invention, it is desirable to first thoroughly clean all surfaces of the cable to be coated. After suitably cleaning the surface to make it free of dirt, oil, grease and all foreign matter, a suitable coat of bonding primer is applied by brushing, spraying or dipping. Such bonding primer may be any suitable type for the purpose, for example such as "Thixon," XAB–199 or XAB–936 primers or bonding adhesives manufactured by Dayton Chemical Products of West Alexandria, Ohio.

The primer or bonding adhesive is permitted to dry for approximately one minute after which the primer coated cable C is inserted in a heated mold, such as shown in FIGURE 1 for example, and subjected to temperature ranges, for example of from 170 degrees to 220 degrees F. The primer coated cable C is retained in the heated mold for a minimum of ten minutes or longer time as necessary to obtain a uniform temperature throughout the cable structure. The time of preheating the primer coated cable may be determined by the diameter of the wire rope or cable being heat treated. The mold may be provided with electric or steam heat and automatically controlled, see FIGURE 1.

Following the primer coating and preheating steps thereof in the mold, any of the liquid polyurethane elastomer mixtures hereinafter given are next poured or injected into the hopper 11 leading to the mold 10, shown in FIGURE 1.

For example, the polymer compounds used may be polyurethane elastomers, such as described in E. I. du Pont de Nemours and Company, Polymer Products Bulletin, "Adiprene" L–100 or L–167, Bulletin No. 7 of October 1965.

As stated in Bulletin No. 7, October 1965, E. I. du Pont de Nemours and Company Adiprene L–100 is one of a series of liquid urethane polymers which can be cured to a strong, rubbery solid by reaction of the isocyanate groups with polymine or polyol compounds. For example, when cured with a dimine curing agent, as noted in Bulletin No. 4, November 1964, E. I. du Pont de Nemours Company for such isocyanate containing polymers, such as liquid urethane polymer described in the above noted Bulletin No. 7, very hard vulcanizates having excellent abrasion resistance and high load bearing capacity are obtained.

Based on this knowledge it has been discovered that because these vulcanizates are very hard and highly abrasive resistant and because they have great resistance to deformation and high load bearing capacity that individual encapsulation of multi-strand wire cable for use as deck pendants and the like with arresting gear provides greater efficiency and durability over and above encapsulated deck pendants using other plastics.

The following gives typical formulation examples of mixed compounds of such liquid urethane elastomers with suitable curing agent, such as "Moca" which is the trademark for an aromatic diamine product of E. I. du Pont de Nemours and Company (Inc.) of Wilmington, Del., described in Bulletin No. 4, November 1964.

*"Moca" (4,4'-methylene-bis-(2-chloranidine) in typical Adiprene L (urethane elastomers) vulcanizates*

Formulation: Adiprene L–100
- Adiprene polymer (liquid urethane elastomer) _ 100
- Moca _____ 12.5
- Moca, percent theoretical equivalent _____ 95

Mixing and curing conditions—
- Mix temperature, ° F. (° C.) _____ 212 (100)
- Cure temperature, ° F. (° C.) _____ 212 (100)
- Cure time, hours _____ 3

Properties—
- Hardness, durometer A _____ 90
- Hardness, durometer D _____ 43
- Tensile strength, p.s.i. (kg./sq. cm.) ___ 4500 (316)
- Elongation at break, percent _____ 450
- Tear strength (ASTM D–470), lb./in. (kg./cm.) _____ 85 (15.2)
- Impact strength (Izod, notched), ft. lb./in. (kg.-m./cm.) _____ Flexed (flexed)
- Abrasion resistance (Bureau of Standards Index) _____ 180
- Resilience (Bashore), percent _____ 45
- Compression set (method A), percent _____ 10

*"Moca" (4,4'-methylene-bis-(2-chloranidine) in typical Adiprene L (urethane elastomers) vulcanizates*

Formulation: Adiprene L–167
- Adiprene polymer _____ 100
- Moca _____ 19.5–20
- Moca, percent theoretical equivalent ____ 96

Mixing and curing conditions—
- Mix temperature, ° F. (° C.) _____ 185 (85)
- Cure temperature, ° F. (° C.) _____ 212 (100)
- Cure time, hours _____ 1

Properties—
- Hardness, durometer A _____ 95
- Hardness, durometer D _____ 50
- Tensile strength, p.s.i. (kg./sq. cm.) ___ 5400 (380)
- Elongation at break, percent _____ 400
- Tear strength (ASTM D–470), lb./in. (kg./cm.) _____ 140 (25)
- Impact strength (Izod, notched), ft. lb./in. (kg.-m./cm.) _____ Flexed (flexed)
- Abrasion resistance (Bureau of Standards Index) _____ 350
- Resilience (Bashore), percent _____ 39
- Compression set (method A), percent _____ 10

The preceding examples can be repeated with similar success by substituting the generically and specifically described reactants and operating conditions of this invention for those used in the preceding examples. Very good results are obtained with the L–167 polymer, cured with (20%) twenty percent "Moca."

The percent of the curing agent (Moca) is of the theoretical equivalent of amino groups needed to react with all the isocyanate group in the polymer.

Next the wire cable or rope impregnated with one of the above mixtures are separated from the mold after approximately twenty to thirty minutes.

Demolding time may be shortened materially by addition of specific catalysts and very reactive curing agents. For example, a small quantity of adipic acid has been found to cut ten minutes from a normal demolding time of thirty minutes.

After demolding or removal of the wire cable in its encapsulation of urethane vulcanizate, it is ready for storage and for use as needed. The mold may be separable to facilitate removal or the same may be an extrusion type mold.

From the foregoing description, one skilled in the art can easily ascertain the essential characteristics and resultant structural features of the resultant encapsulated product of this invention, and without departing from the spirit and scope thereof, can make various changes and modifications of the invention to adapt it to various usages and conditions. Consequently, such changes and modifications are properly, equitably and intended to be, within the full range of equivalence of the following claims.

What is claimed is:

1. An encapsulated wire cable comprising a plurality of strands encapsulated in cured polyurethane elastomer and wherein the cured polyurethane elastomer requires 12.5 to 20 parts diamine curing agent per 100 parts of liquid urethane elastomer for complete chemical reaction, and 95 to 100% of the liquid urethane elastomer is reacted.

2. A wire cable comprising a plurality of strands of wire arranged helically in transversely circular groups, each strand of the cable having an encapsulation of urethane vulcanizate and each of said circular groups being retained together in a molded solid body of said urethane vulcanizate.

3. A multi-strand wire cable, as described in claim 2, wherein said cured polyurethane elastomer requires 12.5 to 20 parts diamine curing agent per 100 parts of liquid urethane elastomer for complete chemical reaction, and 95 to 100% of the liquid urethane elastomer is reacted.

4. A method of wire cable encapsulation wherein said cable is formed of strands, comprising coating each strand of the cable with a primer compound having adhesive characteristics, heating the primer compound coated strands of the cable, pouring an elastomer mixture into a mold around said preheated primer coated strands of the cable, and curing the mixture while in the mold to form a solid vulcanizate formation about each of said strands of said cable.

5. A method as in claim 4 wherein the elastomer mixture comprises liquid polyurethane elastomer and a polymer curing agent.

6. A method as in claim 4 wherein heating of the primer compound coated strands of the cable is carried out in the mold.

7. A method as in claim 4 including the step of adding a catalyst to reduce effective molding time of the elastomer mixture to a solid state.

8. A method as in claim 7 wherein the catalyst is adipic acid and the elastomer mixture comprises liquid polyurethane elastomer and a polymer curing agent.

References Cited

UNITED STATES PATENTS

| | | | |
|---|---|---|---|
| 2,903,779 | 9/1959 | Owens | 57—153 XR |
| 2,904,846 | 9/1959 | Smith. | |
| 3,131,530 | 5/1964 | Dietz | 57—149 |
| 3,195,299 | 7/1965 | Dietz | 57—149 |
| 3,309,861 | 3/1967 | Pierson et al. | 57—149 XR |
| 3,318,082 | 5/1967 | Riggs | 57—149 |
| 2,862,281 | 12/1958 | Klausner. | |
| 3,003,223 | 10/1961 | Breen | 161—175 |

FOREIGN PATENTS

| | | |
|---|---|---|
| 745,224 | 2/1956 | Great Britain. |
| 954,514 | 4/1964 | Great Britain. |

DONALD E. WATKINS, *Primary Examiner.*

U.S. Cl. X.R.

57—162; 117—127; 161—175